United States Patent Office 2,882,270
Patented Apr. 14, 1959

2,882,270

PROCESS FOR THE PRODUCTION OF DRY STREPTOMYCIN TRIHYDROCHLORIDE

Justin J. Murtaugh, Guilford, Ind., and Isidoro Caldas, Jr., New York, N.Y., assignors to Schenley Industries, Inc., New York, N.Y.

No Drawing. Application August 24, 1956
Serial No. 605,960

4 Claims. (Cl. 260—210)

This invention relates to a new and improved process for the production of streptomycin concentrates. More particularly, the invention contemplates the provision of a novel process for the production and recovery of an improved intermediate concentrate of streptomycin in the form of dry streptomycin trihydrochloride.

Solid streptomycin trihydrochloride is an important intermediate that is used extensively in the purification of streptomycin. Thus, a basic step often used in streptomycin purification operations involves the crystallization of crystalline streptomycin trihydrochloride calcium chloride double salt ($C_{21}H_{39}O_{12}N_7$·$3HCl$–$\frac{1}{2}CaCl_2$), or the so-called "streptomycin calicum chloride complex" from methanolic solutions of streptomycin hydrochloride and calcium chloride. It is now well established that the yields in this type of operation are adversely affected by water, and it is imperative that dry methanolic solutions of streptomycin trihydrochloride be employed, and in turn, that a dry, solid streptomycin trihydrochloride product be obtained for admixture with dry methanol in the preparation of such solutions.

Heretofore, several different techniques have been employed by industry for obtaining the trihydrochloride salt in the requisite dry, solid form. One such technique consists of conventional precipitation from aqueous or aqueous methanolic solutions of the antibiotic by addition of a precipitating solvent such as acetone followed by vacuum drying. Other methods practiced heretofore on a commercial scale include spray drying, freeze drying, or direct vacuum drying of concentrated aqueous solutions of the salt. The precipitation method is inherently disadvantageous for the reasons that it requires the use of large volumes of solvent which must be recovered for reuse, the resulting precipitate is difficult to finish or dry completely, and the amorphous streptomycin salts recovered by such a process are difficult to store or transfer because of their extreme hygroscopicity. For example, unless extensive precautions are taken during the latter stages of drying, the material tends to form a hard overlying crust or film which results in a non-uniform product that is "wet" in regions under the crust or film. While spray drying overcomes these difficulties of the precipitation technique, this method requires expensive equipment and very close temperature control to avoid loss of large quantities of valuable material by thermal decomposition. The freeze drying and direct vacuum drying techniques are similarly disadvantageous from the standpoint of capital investment for equipment and control factors peculiar to each method.

The process of the present invention provides a simple, more efficient and less expensive method for obtaining dry solid streptomycin trihydrochloride directly in excellent yields and under conditions which avoid unnecessary loss of streptomycin values as occur in present recovery operations due to excessive handling or over-heating.

In essence, the process of the invention involves vacuum drying of concentrated aqueous or aqueous methanolic solutions of streptomycin trihydrochloride which have been mixed with insoluble, non-reactive or inert filler material. The invention is based, in part, on our discovery that the hard, viscous surface films of dry or partially dried streptomycin trihydrochloride which tend to form during conventional vacuum drying of concentrated streptomycin trihydrochloride solutions can be avoided, and other advantages attained, by the expedient of employing an inert filler material in intimate admixture with the liquid concentrate being dried. Thus, we have found that by mixing the concentrated streptomycin trihydrochloride with a filler substance of the general class described, the relatively larger surface of the porous filler becomes the potential drying medium, with the result that the overall liquid drying surface constitutes but a thin film extended by the inert filler such that no thick film formation can possibly occur. In addition, we find that air entrapped within the porous filler is highly beneficial to the overall drying phenomenon realized in accordance with a process of the invention, in that, when the mixture of streptomycin trihydrochloride and filler is subjected to vacuum, the entrapped air is released in the form of small bubbles which cause the mixture to assume a foam-like consistency that is readily susceptible to drying. The drying technique of the invention also eliminates "bumping" or "spattering" of the streptomycin solutions as characteristically occur in conventional drying operations during boiling or evaporation.

In carrying out a process of the invention, a concentrated solution of streptomycin trihydrochloride is prepared in conventional manner as, for example, by simply vacuum concentrating an eluate from a carbon adsorption type streptomycin recovery process, or an eluate from an ion-exchange type of process for the recovery of streptomycin from fermentation broths. The concentrated solution of streptomycin trihydrochloride should contain as high a concentration of the salt as possible. In actual practice, the solution may contain from 100,000 to 800,000 micrograms of streptomycin base as streptomycin trihydrochloride per milliliter. The streptomycin trihydrochloride used in the process need not be of an especially high degree of purity, although, obviously, the fewer impurities in the solution, the higher will be the concentration of streptomycin trihydrochloride within the liquid concentrate and, in turn, within the final dried, solid product.

To convert the concentrated aqueous solution of streptomycin trihydrochloride to the desired dry product in accordance with the process of our invention, it is merely necessary to add the solution to trays, or pans, or other suitable vessels containing sufficient inert filler material to absorb the liquid solution into the body of the filler, and thereafter placing the mixture within a vacuum drying oven. As will be readily appreciated, it is immaterial whether the concentrated solution of streptomycin trihydrochloride is added to the inert filler or the inert filler is admixed with the streptomycin solution by addition thereto. Furthermore, drying of the mixture can be effected with equally good results within a vacuum oven, or even within vacuum drum dryer or vacuum belt dryer, or even within vacuum mixing equipment. In point of fact, an important advantage of the process of the invention resides in its complete adaptability for use with a variety of different kinds of standard equipment available within most chemical and pharmaceutical plants.

The resulting dried product recovered from the drying oven, consisting of solid streptomycin trihydrochloride and the inert filler material, may be utilized directly in further purification procedures of any type, or stored in admixed form for future use. Actual recovery of the dry, solid streptomycin trihydrochloride from the filler material can be effected by conventional procedures in accordance with the specific requirements of the purification and recovery system in which it is to be utilized, as, for example, by suspension in dry methanol and filtering when utilized in the preparation of the streptomycin calcium chloride complex.

The inert filler substance employed in the process of the invention may be formed from a variety of different materials, and it is simply necessary that the material be insoluble, non-reactive, and capable of absorbing the liquid streptomycin trihydrochloride solutions to the extent necessary to avoid the formation of a heavy thick film at the uppermost layer of the drying surface. In actual practice, we have found that bulky, porous materials of the type of the commercially available diatomaceous-earth type filtration aids such as the substance manufactured and sold under the name "Celite" (trademark), or the commercially available fibrous wood-cellulose type filtration aids such as the substance manufactured and sold under the name "Solka-Floc" (trademark), are ideally suited for use in the process of the invention.

It is believed that the process of the invention may be best understood by reference to the following specific examples showing typical recoveries of dry, solid streptomycin trihydrochloride by application of the foregoing principles and techniques:

Example I

A concentrated solution of streptomycin trihydrochloride, in amount 50 milliliters, was added to a Petri dish containing 20 grams of "Hy-flo Supercel" (trademark) filter aid. The solution of streptomycin trihydrochloride assayed 400,000 micrograms of streptomycin base per milliliter and showed the following purity:

Purity of streptomycin, .3HCl ($\mu$g./mg. of solid) __ 510
NaCl content (mg./ml.) _____ 205
Purity of streptomycin, .3HCl.
Calc. ash free bases ($\mu$g./mg.) _____ 690

After the liquid soaked into the inert filler material, the mixture was placed in a vacuum oven at 35° C. and dried at 5 mm. pressure overnight. The resulting dry ½ inch thick cake weighing 60 grams was ground with a mortar and pestle and analyzed for moisture content and potency. The moisture was 2.1 percent by weight and the biological activity was 325 micrograms of streptomycin base per milligram of solid. This represents a yield from aqueous solution to the dry solid material of 97.5 percent.

Example II

A concentrated streptomycin trihydrochloride solution, in amount 125 milliliters, was mixed with 40 grams of "Celite" filter aid in a 250 milliliter glass beaker. The solution of streptomycin trihydrochloride assayed 400,000 micrograms of streptomycin base per milliliter and showed the following purity:

Purity of streptomycin, .3HCl ($\mu$g./mg. of solid) __ 467
NaCl content (mg./ml.) _____ 250
Purity of streptomycin, .3HCl.
Calc. ash free bases ($\mu$g./mg.) _____ 658

The mixture was dried in a vacuum oven at 5 mm. pressure and a temperature of 45° C., overnight. The dried cake, 2½ inches thick, was ground with a mortar and pestle and analyzed for moisture content and streptomycin trihydrochloride. The moisture content of the ground material was 2.3 percent by weight and the biological potency was 325 micrograms of streptomycin base per milligram of solid. The total weight was 151 grams. This represents a yield from concentrated streptomycin trihydrochloride solution to the dry solid material of 98.5 percent.

Example III

Fifty (50) milliliters of a concentrated streptomycin trihydrochloride solution prepared by concentrating an ion exchange resin eluate obtained from streptomycin broth was mixed with 15 grams of ground cellulose. The solution of streptomycin trihydrochloride assayed 300,000 micrograms of streptomycin base per milliliter and showed the following purity:

Purity of streptomycin, .3HCl ($\mu$g./mg. of solid) __ 484
NaCl content (mg./ml.) _____ 180
Purity of streptomycin, .3HCl.
Calc. ash free bases ($\mu$g./mg.) _____ 682

The mixture was dried in a vacuum oven at 35° C. and 1.0 mm. pressure for sixteen (16) hours. The resulting dried cake weighing 47 grams contained 2.0 percent by weight of moisture and 310 micrograms of streptomycin base per milligram of solid. This represents a yield of 97 percent from the aqueous concentrate to the solid dry product.

Example IV

An aqueous solution of streptomycin trihydrochloride, in amount 1500 milliliters, was added to 630 grams of diatomaceous earth. The solution of streptomycin trihydrochloride assayed 280,000 micrograms of streptomycin base per milliliter and showed the following purity:

Purity of streptomycin, .3HCl ($\mu$g./mg. of solid) __ 318
NaCl content (mg./ml.) _____ 280
Purity of streptomycin, .3HCl.
Calc. ash free bases ($\mu$g./mg.) _____ 467

The mixture was dried at 5 mm. pressure and 100° F. for sixteen (16) hours in eight (8) inch by seventeen (17) inch trays. The resulting dried cake of one inch thickness weighed 1994 grams and contained 210 micrograms of streptomycin base per milligram of solid. The yield from the concentrated aqueous solution to the dry product was 100 percent.

The following additional examples are offered for purposes of illustrating typical purification and recovery techniques employing the solid dry streptomycin trihydrochloride products produced by the process of the invention. Example V is directed to the recovery of streptomycin sulfate by treatment of the dry solid streptomycin trihydrochloride product recovered in Example I above, and Example VI illustrates the preparation of a crystalline streptomycin calcium chloride complex from the dry solid streptomycin trihydrochloride product of Example II above.

Example V

Fifty (50) grams of the ground cake recovered in Example I above, was suspended in 70 milliliters of dry methanol within a 200 milliliter Erlenmeyer flask. The mixture was shaken on a mechanical shaker for sixteen (16) hours. The methanol solution was then filtered off and the cake washed with 40 milliliters of pure dry methanol. The resulting methanol solution of 93 milliliters contained 174,000 micrograms of streptomycin base per milliliter of solution by maltol assay. This represents a recovery into methanol of 99.6 percent. Granular anhydrous calcium chloride, in amount 7.67 grams, was dissolved in the dry methanol solution of streptomycin trihydrochloride and the resulting mixed solution was shaken on a mechanical shaker for sixteen (16) hours. The crystallized calcium chloride complex of streptomycin was filtered, washed with 30 milliliters of a 5 percent by weight of anhydrous calcium chloride in methanol solution followed by 30 milliliters of acetone and dried in a vacuum oven at 50° C. There was recovered 17.3 grams of streptomycin calcium chloride complex, assaying 700 micrograms of streptomycin base per milligram of dry solid by the maltol method. This represents a recovery of 75% in the crystallization step. The dry complex, in amount 17 grams, was dissolved in 100 milliliters of water, treated with 1.5 equivalents of triethylamine sulfate calculated to react with all of the streptomycin and calcium present, made up to 30 percent methanol by volume, filtered to remove calcium sulfate and precipitated in five volumes of methanol. The resulting 14.7 grams of dried streptomycin sulfate recovered, assayed 770 micrograms per milligram. This represents a recovery of 95 percent for the final step.

*Example VI*

One-hundred-fifty (150) grams of the ground dried mixture of streptomycin trihydrochloride and Celite filter aid recovered in Example II above, was suspended in 175 milliliters of dry methanol for six (6) hours, filtered, and the cake washed with 75 milliliters of dry methanol. The resulting 243 milliliter solution of streptomycin trihydrochloride in methanol contained 200,000 micrograms of streptomycin base per milliliter. This represents a recovery into the methanol of 100 percent. Granular anhydrous calcium chloride, in amount 23 grams, was then dissolved in the methanol and the solution allowed to stand for 24 hours. The crystallized streptomycin calcium chloride complex was filtered off, washed with 5 percent by weight of anhydrous calcium chloride in methanol followed by acetone and vacuum dried at 50° C. The resulting 56.5 grams of material recovered was assayed by maltol assay and found to contain 680 micrograms of streptomycin base per miligram of solid. This represents a 78 percent recovery from the methanol solution of streptomycin trihydrochloride.

Having thus described the subject matter of our invention, what it is desired to secure by Letters Patent is:

1. Process for the production of a substantially water-free streptomycin trihydrochloride concentrate that comprises admixing an aqueous concentrated solution of streptomycin trihydrochloride with a chemically-inert, insoluble filler material, vacuum drying the mixture to produce a substantially water-free solid concentrate of streptomycin trihydrochloride in admixture with said inert filler material, and treating the dry solid mixture with a non-aqueous solvent system for separation and recovery of the streptomycin trihydrochloride from said filler material in a form substantially free of water.

2. Process for the production of a dry solid streptomycin trihydrochloride concentrate that comprises adding an aqueous concentrated solution of streptomycin trihydrochloride to a bulky, porous, insoluble, chemically-inert filler material, subjecting the mixture to a vacuum drying treatment to produce a substantially water-free concentrate of streptomycin trihydrochloride in admixture with said inert filler material, and treating the dry mixture with a nonaqueous solvent system for separation and recovery of the streptomycin trihydrochloride from said filler material in a form substantially free of water.

3. Process for the production of a dry solid streptomycin trihydrochloride concentrate that comprises adding a bulky, porous, insoluble, chemically-inert filler material to an aqueous concentrated solution of streptomycin trihydrochloride, subjecting the mixture to a vacuum drying treatment to produce a substantially water-free concentrate of streptomycin trihydrochloride in admixture with said inert filler material, and treating the dry mixture with a nonaqueous solvent system for separation and recovery of the streptomycin trihydrochloride from said filler material in a form substantially free of water.

4. Process for the production of a substantially water-free streptomycin trihydrochloride concentrate that comprises admixing an aqueous concentrated solution of streptomycin trihydrochloride with a bulky, porous, insoluble, chemically-inert filler material whereby the greater portion of said aqueous solution is absorbed by said filler material, vacuum drying the mixture to produce a substantially water-free solid concentrate of streptomycin trihydrochloride in intimate contact with said inert filler material, grinding said solid concentrate to finely-divided form, and treating the finely-divided mixture by suspension within a non-aqueous solvent system and filtering to separate and recover streptomycin trihydrochloride from said filler material in a form substantially free of water.

References Cited in the file of this patent

UNITED STATES PATENTS

| | | |
|---|---|---|
| 1,247,284 | Kruger | Nov. 20, 1917 |
| 2,640,054 | Peet | May 26, 1953 |
| 2,695,285 | Coppock et al. | Nov. 23, 1954 |

OTHER REFERENCES

Waksman: "Streptomycin," published by Williams and Wilkins (Baltimore, Md.), 1949. (Pages 37 and 45 relied on.)